United States Patent [19]
Scholin et al.

[11] 3,858,297
[45] Jan. 7, 1975

[54] AUTOMATIC SPRINGING MACHINE

[75] Inventors: Harold W. Scholin, Park Ridge;
Hieronim L. Lisiecki, Chicago;
George W. Butkus, Tinley Park;
Robert Eitzinger, 37 Plymouth Ct.,
Deerfield, all of Ill.

[73] Assignee: said Eitzinger, by said Butkus

[22] Filed: June 11, 1973

[21] Appl. No.: 368,856

[52] U.S. Cl. ............... 29/208 D, 29/211 C, 29/229, 29/235
[51] Int. Cl. .......................... B23p 19/04, B23q 7/10
[58] Field of Search .......... 29/208 D, 208 C, 211 C, 29/229, 235

[56] References Cited
UNITED STATES PATENTS

| | | | |
|---|---|---|---|
| 2,814,859 | 12/1957 | Erdmann | 29/229 |
| 3,347,083 | 10/1967 | Turpin et al. | 29/235 X |
| 3,494,014 | 2/1970 | Lundgren | 29/211 C |
| 3,581,379 | 6/1971 | Drobilits | 29/229 X |

*Primary Examiner*—Thomas H. Eager
*Attorney, Agent, or Firm*—Root & O'Keeffe

[57] ABSTRACT

A machine for applying expandable ring members, such as garter springs, into the groove of a standard lip seal is disclosed, wherein the spring is expanded over the downwardly facing larger end of a cone-shaped pick-up member, then carried thereby to a station where the seal is waiting, whereupon the spring is forcibly ejected or stripped from the pick-up member onto the seal and into the groove.

21 Claims, 24 Drawing Figures

Patented Jan. 7, 1975

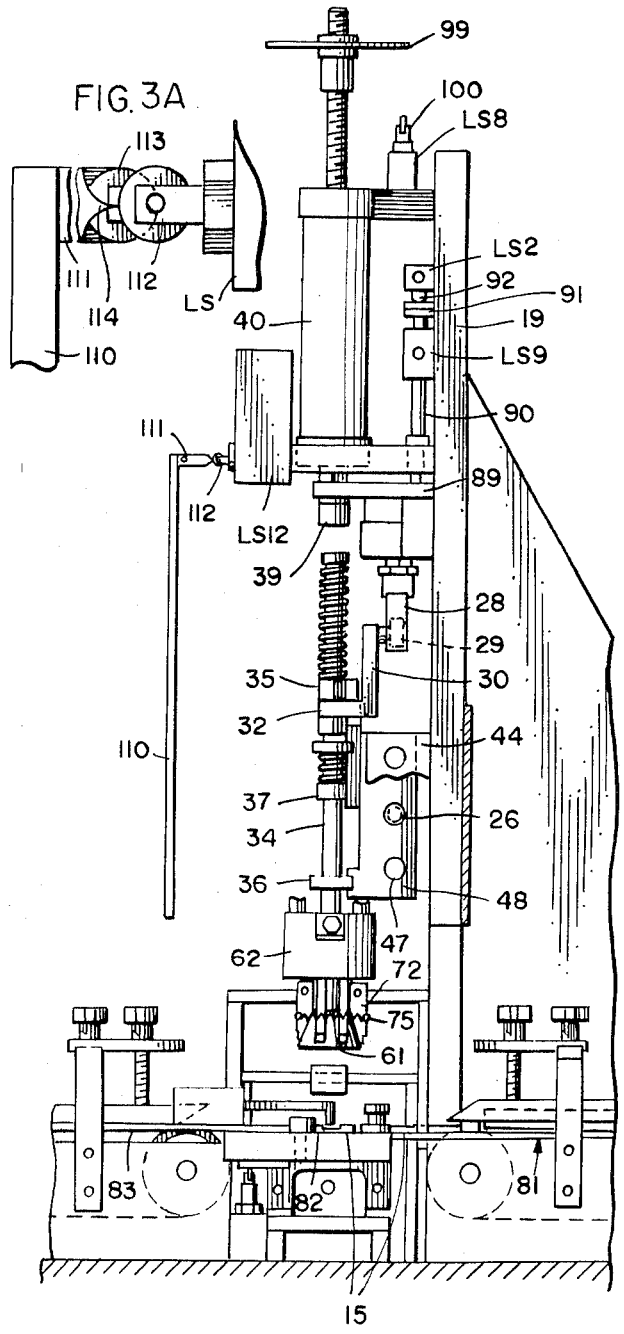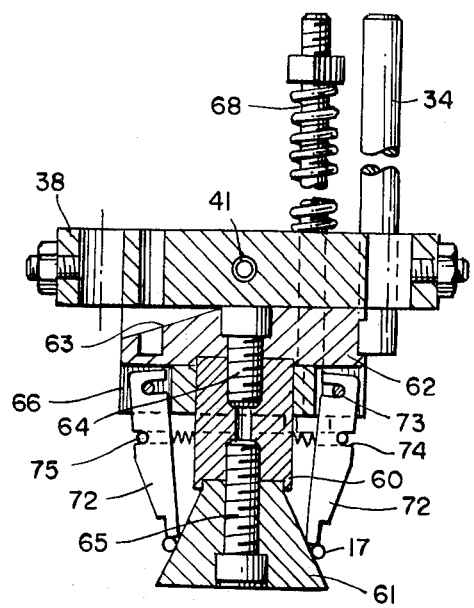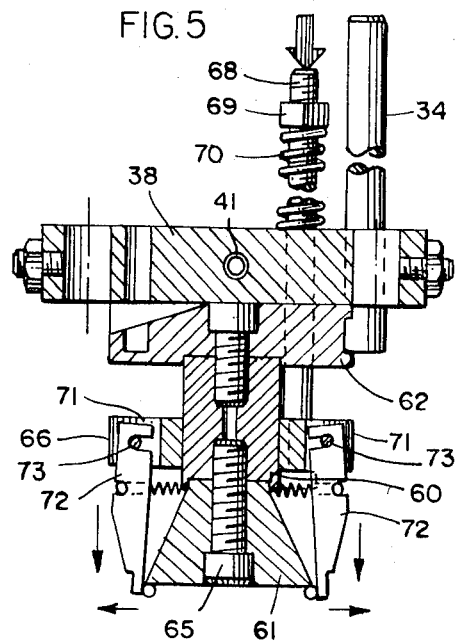

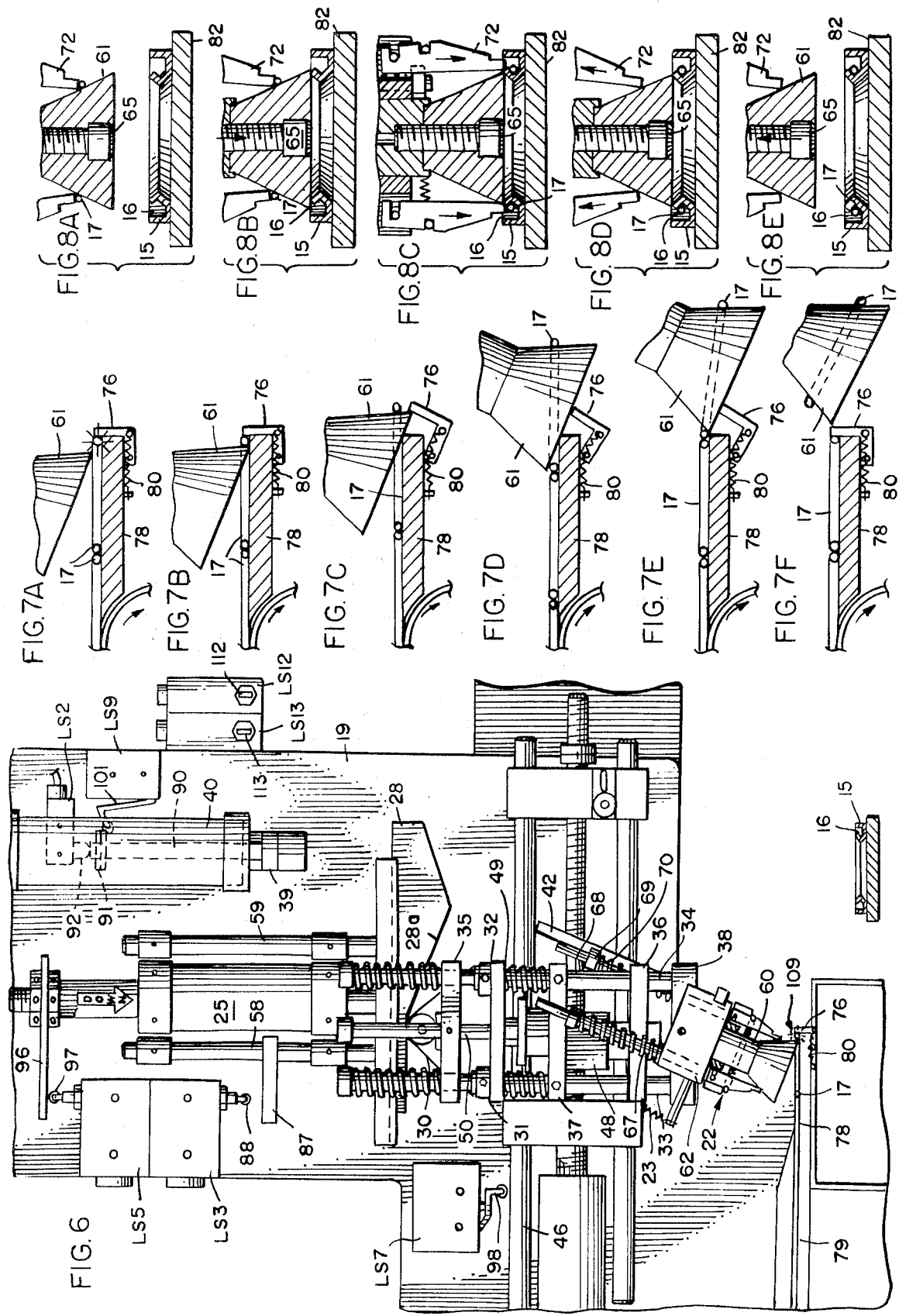

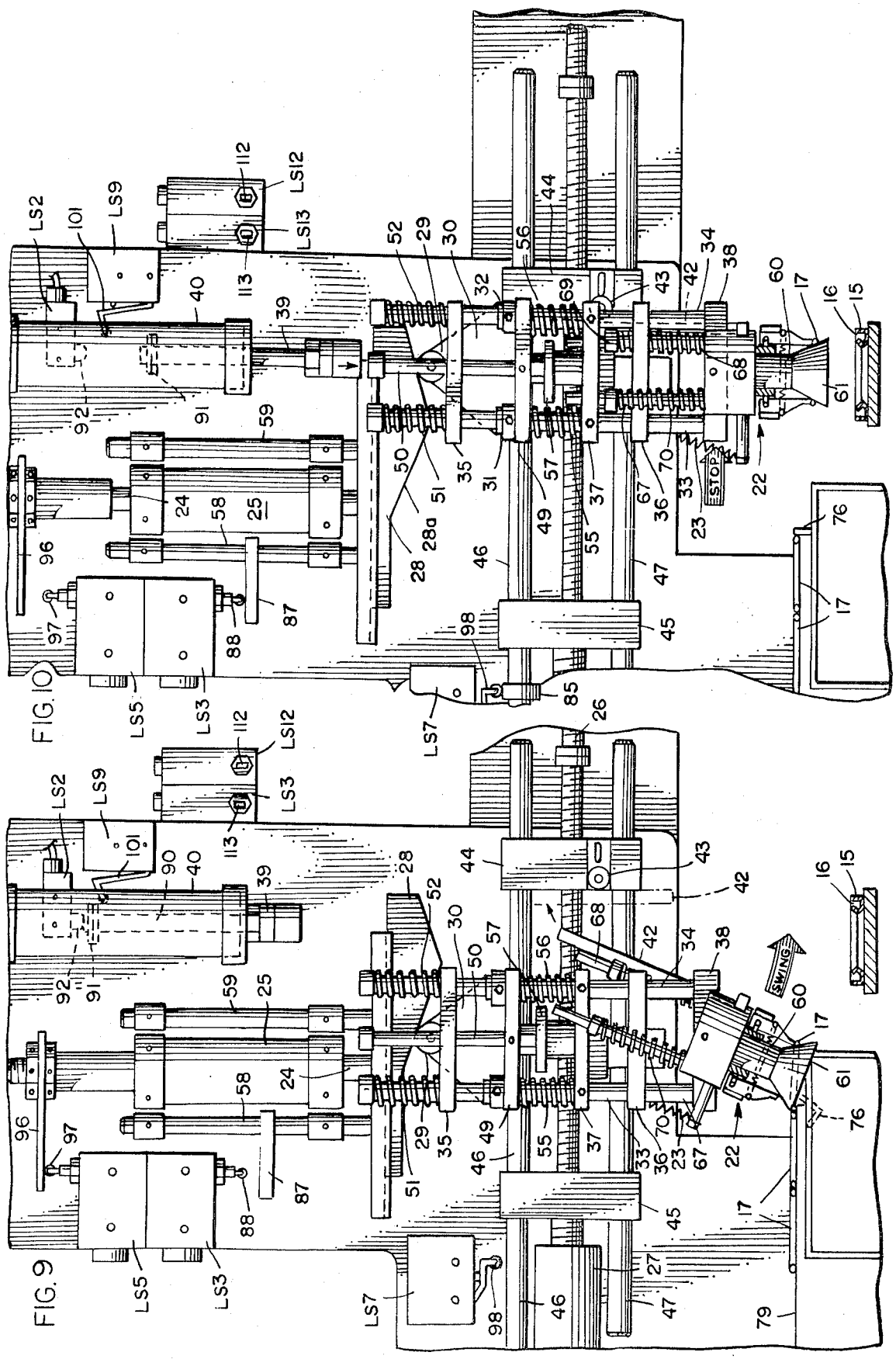

Patented Jan. 7, 1975
3,858,297
6 Sheets–Sheet 5
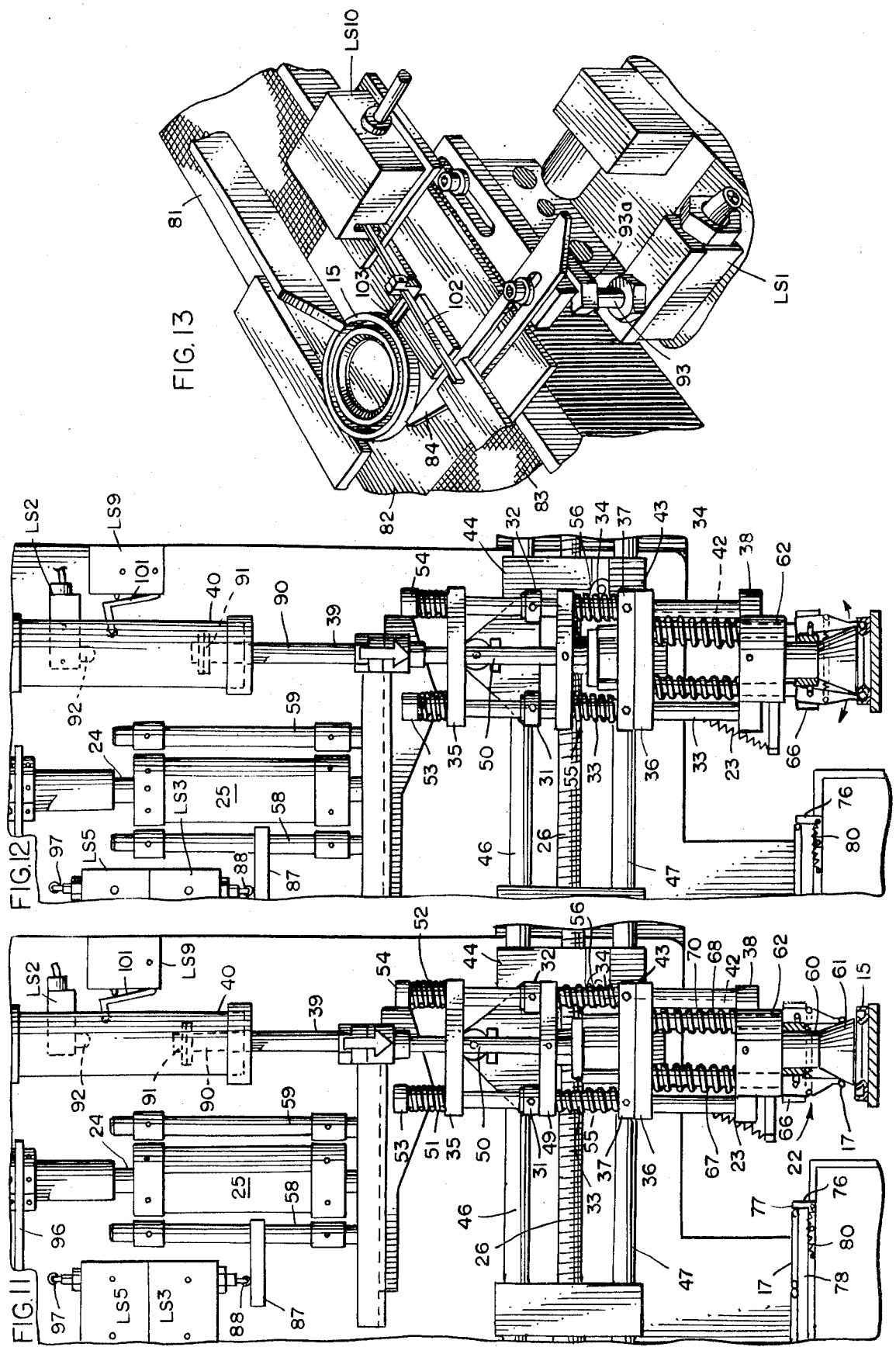

AUTOMATIC SPRINGING MACHINE

BACKGROUND OF THE INVENTION

The invention relates to a springing machine, which automatically applies garter springs to a grooved member, such as the annular groove in the face of a standard lip seal. The machine is also capable of applying other types of expandable ring members, such as O-rings, to the groove in other objects such as a shaft, for sealing purposes. A cone-shaped pick-up member, with the larger end of the cone facing downwardly is provided, wherein the diameter of such larger end is greater than the diameter of the spring in its unexpanded or relaxed condition. The spring is automatically expanded and stretched over the larger end and onto the cone, and then carried by the cone to a station where it is stripped off of the cone over its larger end, and into the groove.

Heretofore, in springing machines of the prior art, springs have been placed, either by hand or mechanically, over the smaller end of a cone-shaped carrier, and then stripped from such carrier over the larger end thereof and into the grooved member. Examples of prior art patents disclosing this general concept, include the Erdmann U.S. Pat. No. 2,814,859; the Turpin, et al U.S. Pat. No. 3,347,083 and the Drobilits U.S. Pat. No. 3,581,379.

The problems encountered with this general type of mechanism are several. Springs or O-rings applied manually directly to a groove is not only a slow process, but subjects the ring member to uneven stretching. In the case of O-rings, this uneven stretching causes excessive wear between the seal and the shaft. U.S. Pat. No. 3,347,083 discloses a tool used for the same purpose, but which is manually operated and therefore subject to the problems of slowness.

Machines designed for this purpose are relatively complicated because of the mechanism necessary to first place the spring over the smaller end of the cone-shaped carrier, and then strip it off of the larger end.

By stretching the spring over the larger end of the cone-shaped carrier, and utilizing the novel mechanism of this invention to place the spring onto the carrier, the machine is considerably simplified, and may be completely automatic.

BRIEF SUMMARY OF THE INVENTION

The invention is directed to novel mechanism for stretching an expandable ring member, such as an annular spring, over the larger end of a cone-shaped carrier and onto such carrier at one station, and then transferring the carrier with the ring member thereon to a second station where stripping fingers force the ring member off of its carrier over the same end thereof, and into the annular groove, in a seal or other such object.

More specifically, an annular spring is placed on a support against a yieldable stop member positioned at the forward edge of the support. A cone-shaped pick-up member is disposed above the spring at an angle, with the larger end thereof lowermost. The forward edge of the base of the cone is brought against the inner circumference of the spring, and wiped downwardly and forwardly along the edge of the support. The stop will be forced out of the way, and the spring will stretch and climb upwardly over the cone base, and thereafter be supported thereby in its relaxed condition.

The carrier will thereafter rotate to an upright position at a second station, where the spring is then stripped off of the carrier over the lower end thereof onto the seal or other object which is to receive the spring.

In view of the foregoing, it is a principal object of the present invention to provide a springing machine of the character described, which will overcome the problems heretofore encountered in the prior art, and to provide a springing machine which is completely automatic.

It is a further object of the invention to provide a springing machine of the character described, wherein the spring or other annular expandable ring member is applied to a cone-shaped pick-up member by automatically stretching it over the larger end of the cone.

Another object of the invention is to provide a springing machine which is completely automatic and performs all of the various steps from applying an expandable ring member to a pick-up member, to the final step of stripping the ring member therefrom, and applying it to an object, as long as there are present on their respective conveyors a ring member and an object to which it is to be applied.

Still other and more specific objects of the invention will appear more fully, as the description proceeds.

BRIEF DESCRIPTION OF THE DRAWINGS

FIG. 3 is an end elevational view of the machine shown in FIG. 3, with certain parts thereof broken away, for the sake of clarity, and taken substantially along the plane of line 3—3 of FIG. 2, showing the pick-up assembly in the same position.

FIG. 3A is an enlarged, fragmentary side elevational view of a portion of FIG. 3, showing two safety switches and the actuator therefor.

FIG. 4 is an enlarged, vertical sectional view through the cone-shaped pick-up member, showing the stripping fingers in their uppermost position.

FIG. 5 is a view similar to FIG. 4, but showing the stripper fingers in their lowermost position.

FIG. 6 is an enlarged, fragmentary, front elevational view, similar to FIG. 2, but showing the pick-up assembly lowered to a position touching or substantially touching the support for the spring member, and with the forward edge of the cone adjacent the inner circumference of the spring.

FIGS. 7A through 7F are diagrammatic, fragmenting illustrations showing the sequence of movement of the pick-up member, as it moves forwardly and downwardly in an angular path to pick up the spring.

FIGS. 8A through 8E are fragmentary, diagrammatic vertical sectional views through the pick-up member in its vertical position, and showing the sequence of movements thereof, as it applies the annular spring member to the annular groove in a seal.

FIG. 9 is a fragmentary, front elevational view, similar to FIG. 6, but showing the position of the various parts of the pick-up assembly after it has advanced to the intermediate position thereof, corresponding to FIG. 7E.

FIG. 10 is a view similar to FIG. 9, but showing the pick-up assembly, fully advanced to the upright position thereof, ready to move downwardly to apply the spring.

FIG. 11 is a view similar to FIG. 10 but showing the pick-up assembly in its lowermost position, adjacent the seal, and with the stripper fingers in their uppermost position.

FIG. 12 is a view similar to FIG. 11, but showing the stripper fingers in their lowermost position, and with a spring applied to the seal.

FIG. 13 is a fragmentary, perspective view on an enlarged scale, showing a seal in position on a support between the infeed and outfeed conveyors therefor, ready to have a spring applied thereto, and also illustrating the gate finger, extending into the path of the seal and taken generally along the plane of line 13—13 in FIG. 2.

DETAILED DESCRIPTION OF THE PREFERRED EMBODIMENT

Briefly described, the machine has three basic movements. The pick-up assembly, which is adapted to pick up springs being successively fed to a support at a first station, is first caused to move downwardly to a position where it is touching, or closely adjacent to, the support for the spring, and with the forward edge thereof positioned adjacent the inner circumference of the spring.

The pick-up member or head is disposed at an angel with respect to the support for the spring, and the next movement transfers the complete pick-up assembly in a horizontal plane to a second station. During this transfer movement, the pick-up member is caused to move forwardly and downwardly at an angle, so that the lower surface or base of the pick-up head moves across the forward edge of the spring support, thereby stretching the spring over the pick-up head, where it continues to be carried forwardly to the second station. The pick-up head is thereupon caused to rotate to an upright position at the second station, where it is located above a seal which has been fed thereto by a conveyor and to which the spring is to be applied.

The third basic movement involved herein causes the pick-up member to be lowered onto the seal, and then have the spring stripped from the pick-up member into the groove of the seal by the movement of stripper fingers.

While the machine herein disclosed is particularly applicable for applying garter springs to the groove in a lip seal, it is to be understood that the machine may be operated for the purpose of picking up any annular, expandable ring member, and conveying it to a position where such ring member may be applied to any other suitable object. For example, and expandable ring could be formed of elastic material, such as rubber, and the object to which such a ring might be applied would be as a seal in the groove of a shaft.

Likewise, while it is preferable to form the pick-up member, itself, in the shape of a cone, we do not wish to be so limited, inasmuch as a spring or other expandable ring member could be stretched over the end of a cylindrical pick-up member, and held thereon, in a stretched condition, and thereafter stripped, in any suitable manner, from such carrier onto the object to which it is to be applied.

Figures 1, 2:
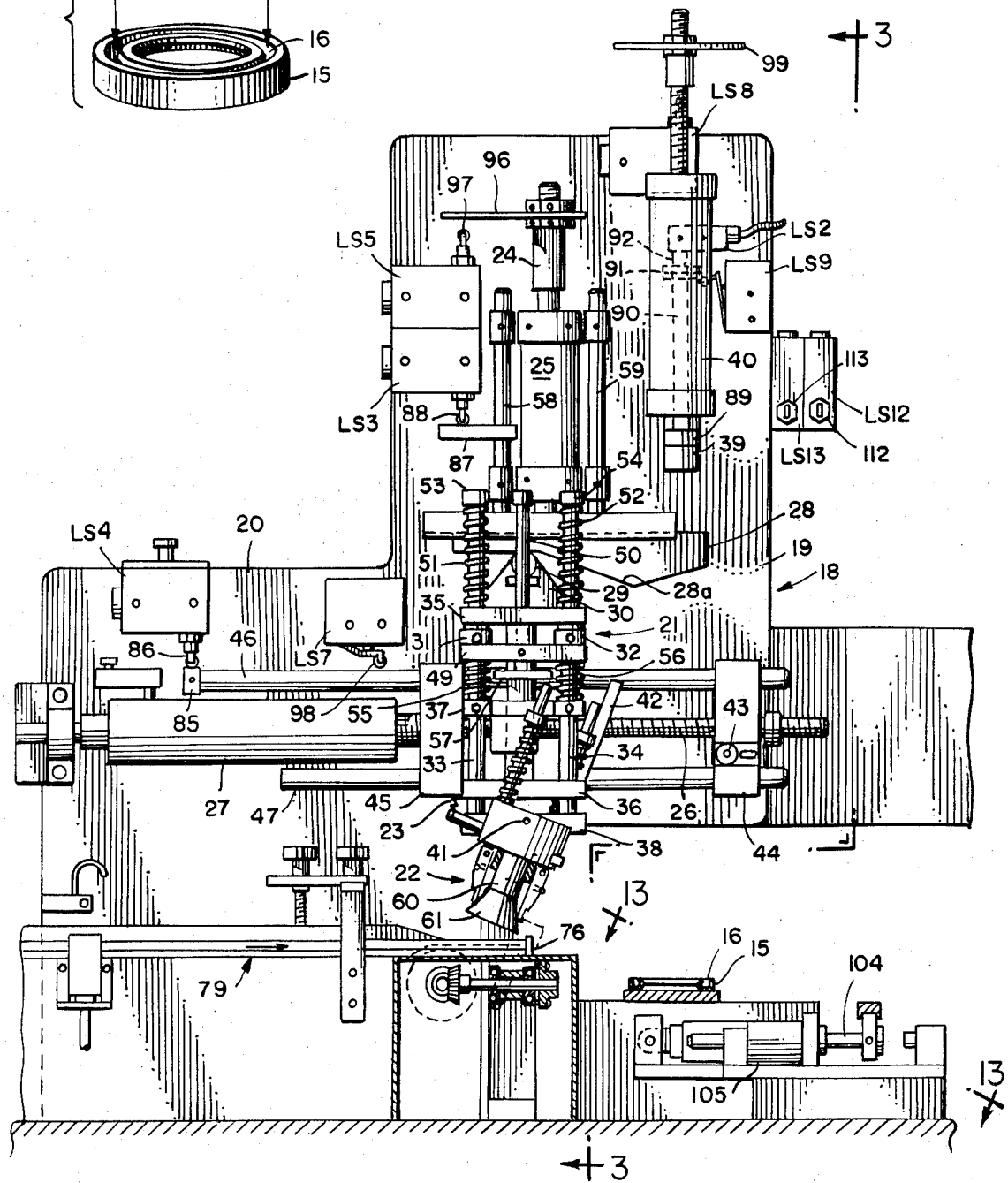
FIG. 1 is an exploded perspective view of a standard lip seal, and an annular spring member, which is to be placed in the groove of the seal by the machine of the present invention.
FIG. 2 is a front, elevational view of the machine embodying the present invention, and showing the pick-up assembly in the elevated position thereof.

Referring now more particularly to the drawings, and especially to FIG. 1, there is illustrated a standard lip seal 15, which is provided with an annular groove 16 into which an expandable ring member, such as the garter spring 17 may be inserted.

FIGS. 2 and 3 illustrate the various parts of the machine in the initial position thereof, ready to begin its operation with a spring in place on its support at the first station, and a seal in place on its support at the second station. The machine is provided with a frame, generally indicated by the number 18, which has, as a part thereof, a vertical support member, which includes an upwardly extending portion 19, and an outwardly extending portion 20.

The pick-up assembly is generally indicated by the numeral 21, while the pick-up head, as a part of the entire assembly, is generally indicated by the numeral 22. The pick-up head or sub-assembly 22 is mounted for rotative movement with respect to the remainder of the assembly, and is normally held in an inclined position, as shown in FIG. 2, by means of a coiled tension spring 23.

The initial step which takes place in the operation of the machine is movement of the entire pick-up assembly in a downward direction from the position shown in FIG. 2, to the position shown in FIG. 6. This is accomplished, preferably, by a piston and cylinder arrangement mounted on the support 19, and preferably operated pneumatically. The piston 24 reciprocates in a vertical direction within the cylinder 25, and is actuated by means which will be described in greater detail hereinafter.

The second basic movement is the moving of the pick-up assembly in a generally horizontal plane, and in a direction toward the right, as viewed in FIGS. 2, 6, and 9 through 12. This motion is accomplished by means of a piston rod and extension 26 thereof, reciprocable within the horizontally positioned cylinder 27 and on which the pick-up assembly is mounted.

A cam plate 28 is secured to the lower end of the piston rod 24, and will move downwardly with such piston rod. It will be noted in FIG. 2 that a cam follower 29, mounted on the plate 30, is urged upwardly against the lower contoured edge of the cam plate 28. When the piston rod 24, and the cam plate 28 move downwardly, it will likewise force the cam follower 29, and plate 30, downwardly.

The plate 30 is provided with a pair of spaced, horizontally extending legs 31 and 32, which receive the rods 33 and 34 and to which the legs are secured. These rods are mounted for vertical reciprocation, and are guided in such movement by the guide bars 35 and 36, which are fixedly mounted on the machine frame, and through which the rods pass. Other cross bars 37 and 38 are also clamped to the rods 33 and 34, and more therewith.

As will be described in greater detail hereinafter, movement of the pick-up assembly toward the right from its position shown in FIG. 6, by means of the piston rod 26 will cause the cam follower 29 to follow the contour of the lower edge of cam 28, which thereupon moves the cam plate 30, as well as the pick-up head, sub-assembly 22, downwardly and forwardly, in an angular direction.

When the pick-up assembly reaches its farthest position toward the right, the pick-up member will be rotated to its upright position above the seal 15. At this point, the third basic movement of the assembly takes place, which is the vertical, downward movement of the pick-up member. In this position, toward the right, the assembly will be located immediately below the piston rod 39, which is adapted to reciprocate, vertically, within the cylinder 40, as may be evident upon viewing FIG. 10, for example.

When the pick-up assembly is in its farthest position toward the right, as seen in FIG. 10, the piston rod 39 will move downwardly against the assembly and force the pick-up head downwardly to the position shown in FIG. 11 where it is adjacent the seal 15 or other object to which the ring member is to be applied. The pick-up head will then remain stationary while continued downward movement of the piston rod 39 will urge the stripper fingers downwardly and strip the ring member therefrom and into the groove 16 of the seal 15.

This, then, is the general overall operation of the machine, and upward movement of the piston rod 39 will return the stripper fingers and stripper head back to their uppermost position, whereupon, the piston rod 26 will be retracted in the cylinder 27 and all parts will be returned back to their positions shown in FIG. 2.

Reference is now made particularly to FIG. 2 for a more detailed description of the parts. The pick-up head, or sub-assembly, is pivotally mounted on the cross bar 38 by means of the pivot pin 41. This sub-assembly is also provided with an upwardly extending bar 42 which rotates with the pick-up head. When the transfer means is operated to move the entire assembly toward the right to the position shown in FIG. 10, the bar 42 will be moved against a roller 43, mounted on the guide bracket 44, whereupon the pick-up head will be rotated to its upright position.

Another guide bracket 45 is mounted on the frame of the machine, adjacent one end of the cylinder 27 through which the piston rod 26 is guided in its reciprocating movement. Additional guide rods 46 and 47 extend above and below the rod 26 and through the two guide brackets 44 and 45, and are so mounted as to move with the piston rod 26.

This is accomplished by reason of the fact that the piston rod 26, as well as the two guide rods 46 and 47 are all mounted on or secured to a mounting plate 48, located behind the vertical rods 33 and 34, as may be more clearly seen by referring to FIG. 3. The two cross bars 35 and 36 are also secured to this mounting plate 48, so that when the piston 26 is actuated to move toward the right, it will carry with it the mounting plate 48, the two guide rods 46 and 47, as well as the cross bars 35 and 36, and the entire pick-up assembly.

A cross bar 49, through which the rods 33 and 34 extend is movable with respect to said rods, and is secured to the upright rod 50, so that any downward movement of such rod will also move the cross bar 49 downwardly. Coiled compression springs 51 and 52 surround the rods 33 and 34 and extend between the cross bar 35 and the enlarged heads 53 and 54 on the respective rods. These springs, therefore, urge the rods 33 and 34, together with the cross bars 37 and 38 clamped thereto, and the cam follower plate 30, in an upward direction.

Coiled compression springs 55 and 56 also surround the two rods 33 and 34 and extend between the cross bar 37 mounted thereon and the fixed cross bar 49. A diagonally extending actuating bar 57 is secured to the lower end of rod 50. As will appear more fully hereinafter, when the rod 50 is caused to move downwardly when the pick-up head is in its upright position, the bar 57 will move downward and cause the ring member to be stripped from the pick-up member and onto the seal.

FIG. 2 shows the machine in readiness to begin operation. The first action is the downward movement of the complete pick-up assembly to its position shown in FIG. 6. As mentioned above, this is accomplished by a downward movement of the piston 24 within the cylinder 25. The cam bar 28 is mounted on the lower end of the piston rod 24, and on the two guide rods 58 and 59, so that when the cam bar is caused to move downwardly by the movement of the piston rod 24, the rods 58 and 59 will likewise move downwardly.

When this initial downward movement takes place, the cam bar 28 is in contact with the cam follower 29 mounted on the cam follower plate 30. Downward movement of the piston rod 24 will move the cam bar 28 downwardly, together with the follower 29 and plate 30, as well as the legs 31 and 32. Since the plate 30, through the legs 31 and 32, is mounted on the rods 33 and 34, these rods will then move downwardly carrying with them the cross bars 37 and 38 also mounted thereon, and the pick-up head pivotally mounted on the cross bar 38. The legs 31 and 32 will force cross bar 49 downwardly therewith.

At this point, then, the various parts will be in the positions shown in FIG. 6.

When the pick-up head reaches this position, the piston 26 will be actuated to transfer the pick-up assembly toward the right to the position thereof shown in FIG. 10. During this transfer movement, the cam follower 29 will follow the bottom edge of the cam plate 29 in a downward direction. The angle of the bottom edge 28a of the cam plate 28 is substantially the same as the angle which the base of the pick-up member has with respect to the horizontal. Thus, as the assembly moves toward the right, as viewed in the various figures, the cam follower 29 will move downwardly and forwardly at the desired angle, carrying with it in an angular direction the cam follower plate 30, together with the legs 31 and 32 thereon, as well as the rods 33 and 34 and the cross bars 49, 37 and 38. Since the pick-up head is pivotally mounted on the cross bar 38, it will also be carried downwardly and forwardly at the desired angle. At this point, the various parts will be in the position shown in FIG. 9. Continued movement toward the right will carry the assembly forwardly and downwardly past the low point on the cam plate 28 so that in the extreme right hand position the parts will be as shown in FIG. 10, with the pick-up head positioned immediately above the seal or other object to which the ring member is going to be applied.

The assembly has now been moved to a position where the center rod 50 is immediately below the piston rod 39. This rod is then caused to move downwardly into contact with the end of the rod 50 and move it downwardly. The motion will carry with it the cross bar 49 pinned to the rod, and the cross bar 37 through the pressure of the springs 55 and 56. Since the cross bar 37 is clamped to the rods 33 and 34, these rods will move downwardly, carrying with them the cam follower plate 30, because it is also secured to these rods, by reason of the legs 31 and 32, and the cross bar 38 to which the pick-up head is attached. These various parts then will all move downwardly together until the cross bar 37 comes against the fixed cross bar 36, at which point the base of the pick-up head will be adjacent to the seal 15.

This position of the various parts will then be as shown in FIG. 11. As will be seen presently, continued downward movement of the piston rod 39 and the rod 50 will cause the ring member to be stripped from the pick-up head.

The pick-up head or sub-assembly, indicated, generally, by the numeral 22 comprises a mandrel portion 60. In the preferred form of the invention, this mandrel is provided with a cone-shaped lower portion 61, the base of which has a diameter larger than that of the ring member in its unexpanded condition. For an understanding of the details of the construction of this mandrel and the pick-up head or sub-assembly, reference is made to FIGS. 4 and 5. A cylindrical member 62 has as a transversely extending groove therein adapted to receive the cross bar 38. The pivot pin 41 extends through the cylindrical member 62 and the cross bar 38 to enable the pick-up head to be rotated from its normal inclined position shown in FIGS. 2, 6, and 9 to the upright position of FIGS. 10, 11 and 12, as heretofore described. It will be noted that one end of the transverse groove in the cylindrical member 62 has its bottom portion inclined as shown at 63, thereby to enable the sub-assembly to be rotated about the pivot pin 41 to its inclined position.

The upper part of the mandrel 60 is cylindrical and extends downwardly below the cylindrical member 62. A retainer bolt 64 extends downwardly through the cylindrical member 62 from the bottom of the transverse groove therein, and extends below the member 62. The upper end of the mandrel 60 has an internally threaded opening which receives the threaded retaining member 64 and thereby secures the mandrel in place. The cone-shaped member 61 is also provided with an upwardly extending threaded retaining member 65, which threadedly engages an opening in the lower end of the cylindrical portion 60, whereupon a unitary mandrel assembly is provided. This enables cone-shaped members of different sizes to be used for different sizes of springs and seals, merely by removing one cone and replacing it with another.

An annular support 66 is mounted below the cylindrical member 62 for a sliding movement along the length of the cylindrical portion 60 of the mandrel. This annular support is held in assembled relation with the remainder of the pick-up head by means of the two rods 67 and 68. These rods extend downwardly through openings in the cylindrical member 62 and at their lower ends are threaded into the annular support 66.

The one rod 67 is positioned in front of the cross bar 38, while the other rod 68 is positioned rearwardly of the cross bar 38. It will be evident that a vertical sliding movment imparted to the rods 67 and 68 will likewise cause a reciprocating movement of the annular support member 66. The rods 67 and 68 are provided with suitable collars, such as that shown at 69, against which the upper end of coiled springs 70 may bear. The lower end of each spring bears against the upper surface of the cylindrical member 62 thereby normally urging the rods and the annular support member 66 upwardly against the lower face of the cylindrical member 62.

The annular support 66 is provided with a plurality of radially extending recesses 71, each of which receives the upper end of a finger 72 for pivotal movement. It will be evident that these stripper fingers may assume any desired shape or configuration, but for purposes of illustration, each of these fingers is shown herein as being provided with a groove near the upper end thereof to receive a pin 73 in each recess 71 which acts as a pivot around which each pin may rotate. Each finger 72 is also provided with an inwardly extending recess 74, to receive an annular spring member 75, thereby to yieldably hold the stripper fingers inwardly. The lower ends of these fingers will thereupon bear against the surface of the cone-shaped pick-up head, as shown in the various figures of the drawings. As will be evident, a downward movement of rods 67 and 68 with respect to the other parts of the assembly will move downwardly the annular support 66, carrying with it the stripper fingers 72, thereby stripping from the base of the mandrel the spring or other expandable ring member carried thereby.

One of the features of the present invention is the provision of novel means for placing the exapandable ring member onto the mandrel from the lower end thereof. As mentioned, heretofore, the cone-shaped head, from which a spring is to be stripped is disclosed in the prior art. The novelty herein, however, lies in the placing of the annular ring member onto the cone-shaped pick-up head by stretching it over the larger end or base thereof. For a better understanding of the manner in which this is accomplished, reference will first be made to FIGS. 6 and 9.

It has already been explained how the pick-up assembly is first moved downwardly in its entirety to the position shown in FIG. 6, wherein the pick-up head is inclined at an angle with respect to the horizontal, and wherein the forward edge thereof is brought against the inner circumference of the spring or expandable ring member 17. The pick-up assembly is then transferred from this first station to the second station shown in FIG. 10, but during this movement the pick-up member will be caused to move forwardly and downwardly at an angle.

From the position shown in FIG. 6, the entire assembly will be moved toward the right, as viewed in the various figures, by reason of the movement of the piston rod 26 which carries with it the guide rods 46 and 47 on which the pick-up assembly is mounted. A spring-loaded stop member 76 is normally urged against the forward edge 77 of a support 78, which supports the ring members 17, as they are fed thereto by a conveyor 79. The leading ring member 17 will be fed to the support 78 by the conveyor 79, and will be stopped in its forward movement by the stop member 76. The pick-up head will thereupon be moved downwardly from its position, shown in FIG. 2, to the position thereof shown in FIG. 6.

Forward movement of the pick-up assembly to the position shown in FIG. 9 will cause the spring 17 to stretch over the larger end of the pick-up head and be applied thereto. This sequence of operation will become clear upon viewing FIGS. 7A through 7F.

FIG. 7A shows the cone-shaped member and the other parts associated therewith in the same position which they occupy in FIG. 2. FIG. 7B shows the parts in their same position as in FIG. 6. As the pick-up assembly moves forwardly, the cam follower 29 and the entire pick-up assembly will follow the angle of the edge 28a of the cam bar 28 which, as previously mentioned, is disposed at the same angle with respect to the horizontal, as the lower face of the pick-up head. The forward edge of the base of the pick-up head will bear against the spring member 17, and, as it moves forwardly, it will pick up the spring and urge the stop member 76 in a clockwise direction away from the forward edge of the support. FIG. 7C shows the position of the spring where the forward portion thereof has begun to climb upwardly on the surface of the pick-up head. The spring will begin to stretch and, as may be seen in FIG. 7D, as the forward part of the spring continues to climb upwardly on the pick-up head, the rear portion thereof will be stretched over the rear edge of the pick-up head. FIG. 7E illustrates the position of the spring on the pick-up head where it is just clearing the rearmost edge thereof and in FIG. 7F the spring has been applied to the pick-up head, and if this head is cone-shaped, as shown in the drawings, the spring will rest on the surface of the head and be in its relaxed or unexpanded condition.

In this position, the parts will be, substantially, as shown in FIG. 9, and the entire assembly continues to move forwardly until the bar 42 comes against the roller 43, which not only acts as a stop for the assembly, but also causes the sub-assembly to rotate to its upright position shown in FIG. 10. In the meantime, the spring-loaded stop 76 has been returned to its normal position by action of the spring 80, secured thereto, and the next ring member, which has been fed to the support by the conveyor 79, will come against the stop member and await return of the pick-up head for the next cycle of operation.

The cross bars 35 and 36 are fixed with respect to the other parts of the assembly and will not move in a vertical direction. Forward movement of the assembly causes all parts thereof, except the bars 35 and 36, to have a movement in a vertical plane, comparable to the contour of the lower edge 28a of the cam plate 28. It will be noted in FIG. 10 that the parts are positioned in accordance with the location of the cam follower 29 with respect to the cam bar 28. During the transfer of the assembly, certain parts have been caused to move downwardly and then upwardly a slight distance, as it passes the low point of the cam.

To review, briefly, the relationship between the various parts of the assembly, the legs 31 and 32 fixed to the cam follower plate 30 are mounted on the rods 33 and 34. The cross bars 37 and 38 are likewise secured to or clamped on these rods 33 and 34, so that any downward movement imparted to the plate 30 will cause a similar movement of the legs 31 and 32, the rods 33 and 34, and the cross bars 37 and 38. Since the cross bar 49 is slidably mounted on the rods 33 and 34, the downward movement of the cam follower plate 30 will also move the bar 49 downwardly. Since the pick-up head 22 is mounted for rotation on the cross bar 38, it will likewise be carried downwardly by movement of the cam follower 30.

The position of the parts as shown in FIG. 10 is such that the center rod 50 will be positioned immediately below the piston rod 39, which reciprocates within the cylinder 40. Downward movement of the piston rod 39 from its position shown in FIG. 9, will cause the lower end thereof to come against the upper end of rod 50, and continued downward movement thereof will move said rod, and the cross bar 49 secured thereto, and the lower bar 57 on the bottom of the rod, downwardly until said bar 57 comes against the upper ends of the rods 67 and 68.

This initial downward movement of the cross bar 49 will exert a force against the two springs 55 and 56, and through these springs will move the cross bar 37 downwardly. Since this bar is mounted on the two rods 33 and 34, it will thereupon cause these rods to move downwardly together with the cross bar 38, and the pick-up head thereon. This movement also continues until the cross bar 37 comes against the fixed bar 36. At this point, the parts will be in their positions as shown in FIG. 11.

Because the bar 37 and the rods 33 and 34 and all parts mounted thereon are prevented from any further downward movement by reason of the fixed cross bar 36, continued downward movement of the piston rod 39 and the upright rod 50 will cause the two rods 67 and 68 to move downwardly with respect to the cross bars 37 and 38, and with respect to the cylindrical member 62 and the mandrel 60. The only parts which will move downwardly with these rods 67 and 68 will be the annular support 66 on which the stripper fingers 72 are mounted in the manner heretofore described.

The distance through which the cross bar 49 and the rods 67 and 68 may move in this additional distance will be limited by reason of the springs 55 and 56, surrounding the rods 33 and 34 and against which the bar 49 will be urged. It will be noted in FIG. 12, that the bar 49 has moved downwardly against the force of the springs 55 and 56 and is spaced downwardly from the legs 31 and 32 on the cam follower plate 30. The cross bars 37 and 38, together with the cylindrical member 62 and pick-up member, will remain in the same position shown in FIG. 11. In FIG. 12, the annular support member 66 is shown in its lowermost position to which it has been moved by the rods 67 and 68, and is shown separated from the cylindrical member 62. In this position, which may be more clearly seen in FIG. 5, the downwardly movement of the annular support 66 will have carried with it all of the stripper fingers 72, so that the lower ends thereof will have moved the spring 17 downwardly, and expanded it over the larger lower end of the base of the cone 61. In this position, after the spring has been forced off of the lower end of the cone, it will be received in the annular recess 16 in the seal 15, and will be seated therein.

This sequence may be more clearly understood by reference to FIGS. 8A through 8E. FIG. 8A shows the position of the parts in which they appear in FIG. 10. The initial downward movement of the piston rod 39 will move all of the parts downwardly to the position shown in FIG. 8B, with the base of the cone closely adjacent the upper surface of the seal 15. Continued movement of the piston rod 39 and rod 50, as heretofore described, will then cause the annular support member 66 to move downwardly and carry with it all of the stripper fingers 72. There may be as many of such fingers, as desired, to carry out the purposes of the invention. FIG. 8C illustrates the spring as it has been stripped from the pick-up head, and as it is seated within the groove 16. FIG. 8D shows the initial upward movement, where the annular support 66 and stripper fingers 72 have been returned to their normal positions. FIG. 8E is the next movement of the stripper head, showing the parts returned to their positions shown in FIG. 10.

The piston rod 39, as well as the piston rod 24, will both have been returned upwardly to their normal positon at this point, whereupon retraction of the piston rod 26 will take place, thereby carrying the entire pick-up assembly bact to its initial position, as shown in FIG. 2, ready for the next cycle of the machine.

The seals, or other objects to which the ring members are to be applied are likwise fed to the second station by conveyor means. An infeed conveyor 81 (see FIG. 13) conveys the seals in succession to a support member 82, which positions the seal at the second station so that it will be immediately below the pick-up head after it has been moved from having picked up the spring member. After the spring has been applied to the seal, an outfeed conveyor 83 will carry it away from the machine. A gate finger 84 in the path of the movement of the seal will stop the seal long enough for the spring to be applied thereto. As will be brought out in greater detail, presently, the present of a seal at the second station on its support 82 will be detected whereupon the finger 84 will be moved into the path thereof to hold it against movement. Immediately after the spring has been applied to the seal, the finger 84 will move out of the path of the seal and will remain in that position until the next seal is detected to move the finger back into the path thereof.

Suitable guide rails are provided on the infeed and outfeed conveyors for the seals and on the conveyor for the ring members, so as to guide them in a straight path to their respective stations. Such guide rails are adjustable to accommodate seals and springs of varying diameters. There are likewise provided upper rails above the seals and ring members to prevent them from climbing over each other as they are being fed along the conveyor.

As mentioned heretofore, the entire machine is designed to be automatic so that each step in the sequence will be performed automatically and the machine will continue to cycle, as long as there are springs and seals in place to be assembled. Before discussing the wiring diagram in detail, it may be well, briefly, to refer to the control switches in the various figures of the drawings. When the machine is ready to cycle, a collar 85 on the horizontal guide rod 46 will be in contact with the switch arm 86 and cause the contacts of switch LS4 to close. The vertical guide rod 58 has an outwardly extending arm 87 thereon, and when the piston rod 24 is in its uppermost position, this arm 87 will be in contact with the switch arm 88 of LS3 and thereby close the contacts of that switch. The piston rod 39 within cylinder 40 is also normally in its uppermost position, as shown in FIG. 2. The lower end of the rod 39 has a rearwardly extending arm 89 thereon (see FIG. 3) to which is fixed an upwardly extending rod 90 having a head 91 at its upper end. Reciprocation of the piston rod 39 will carry with it the arm 89 and the rod 90, and when in its uppermost position, the head 91 thereof will be in contact with the switch arm 92 of LS2, thereby to close the contacts thereof.

The contacts of switch LS1 are normally closed, but will be opened by movement of the bar 93a off of the switch arm 93 when finger 84 is retracted. The finger 84 will normally be in the path of the seal, as seen in FIG. 13, and when in this position, the switch LS1 will be closed. Thus, it will be evident that in the normal, unactuated position of the various parts, the contacts of switches LS1, LS2, LS3 and LS4 will all be in their closed position. The machine will not operate in the absence of either a spring at the first station or a seal at the second station or on the conveyor.

A vibratory feeder mechanism (not shown) is provided adjacent the beginning of the conveyor 79 from which springs are fed onto the conveyor by vibrating the feeder. The vibratory feeder is of a well known type, and need not be disclosed in detail here, but suffice it to say that when the machine is first set in operation, the feeder will be loaded with springs and will be vibrating so that they will be placed onto the conveyor, one at a time. At the point on the conveyor where the springs are fed to it, there is provided a spring detector preferably in the form of an electric eye.

As long as there are springs on the conveyor to interrupt the beam of the electric eye, the feeder will not vibrate. However, when the conveyor calls for springs, because one has not interrupted the beam of the electric eye, the feeder will be caused to vibrate and add more springs to the conveyor. As will be seen hereinafter, when discussing the wiring diagram of FIG. 14, the feeder is generally indicated by the numeral 94 and the contacts of the electric eye for coil relay 3CR are indicated at 95.

Referring now, particularly to FIGS. 2 and 6, the sequence of operations by actuation of the various switches will be more readily understood. The piston rod 24 has an upper arm 96, extending outwardly therefrom, above the switch arm 97 of LS5. In the initial downward movement of the piston rod 24 to move the pick-up head downwardly from the position of FIG. 2 to the position of FIG. 6, the contacts of LS3 will be opened due to the downward movement of the arm 87, and actuating arm 96 will move into contact with the switch arm 97, thereby closing the contacts of LS5.

This closure of LS5 then causes the transfer rod 26 to move toward the right to transfer the pick-up assembly to the second station, and when this movement begins, it will be noted that the collar 85 on the guide rod 46 will also move to the right out of contact with the switch 86, whereupon the contacts of LS4 are opened. When the assembly reaches its farthest position to the right at the second station, as shown in FIG. 10, the collar 85 on guide rod 46 will have moved into contact with the switch arm 98 and LS7, thereby closing the contacts of the switch. When this occurs, the piston rod 24 will be returned to its normal position, with the contacts of LS3 closed, and those of LS5 opened again. Also, at this time, the piston rod 39 will be caused to move downwardly by closing the contacts of LS7. As explained above, this motion of the piston rod 39 will carry the assembly downwardly from the positions of the parts shown in FIG. 10 through the position shown in FIG. 11, and the final position shown in FIG. 12.

Downward movement of this piston rod 39 will cause the upper end 91 of rod 90 to move downwardly to open the contacts of LS2 by moving away from the switch arm 92. Movement downwardly of the piston rod 39 with the disc 99 mounted adjacent the upper end thereof, will cause disc 99 to move downwardly into contact with the switch arm 100, closing the contacts of LS8. The closing of this switch will thereupon move the piston rod 39 upwardly, back to its original position. In its upward movement, the enlarged head 91 on the upper end of the rod 90 will contact a roller on the end of the switch arm 101 of LS9, thereby closing the contact, momentarily, and sending a signal which causes the transfer rod 26 and the entire pick-up assembly, mounted thereon, back toward the left to its original position. At the same time, the signal from LS9 will retract finger 84 out of the path of the seal. As will be evident, when this occurs, the collar 85 on the guide rod 46 will again open the contacts of LS7 and close the contacts of LS4, at which time the contacts of all of the switches, LS1, LS2, LS3, and LS4 will have been closed, and as long as there is a spring at the first station and a seal on the infeed conveyor and at the second station, then the machine is ready to cycle again.

At this point, it should also be noted that on the infeed conveyor 81 for the seals, there is a seal detector, not shown in the drawings but identified in the wiring diagram as LS11. If there is no seal at the beginning of the conveyor, the contacts of this switch will be opened and the machine will not operate.

Reference will now be made briefly to FIG. 13, where it will be noted that there is a switch arm 102 which is contacted by the seal 15, as it moves onto the support 82 by the conveyor 81. As this seal moves to this position, and passes the finger 103 on the switch arm 102, it will momentarily close the contacts of LS10, sending a pulse to move the piston rod 104 in the cylinder 105 in a direction toward the left, as viewed in FIGS. 2 and 13. The finger 84 is carried by bar 93a mounted on the piston rod 104, and will be carried into the path of the seal 15 by this movement, and will remain there until the spring has been applied. As will be seen more readily when the wiring diagram is discussed, a capacitor is discharged when the seal detector arm 102 closes the contacts of LS10 and remains charged until LS10 is again actuated to retract piston rod 104 and carry with it the finger 84 out of the path of the seal.

It will thereupon be evident from the foregoing description, that the machine will continuously operate, automatically, cycle after cycle, as long as there is a spring at the first station, and a seal at the second station. If either a seal or a spring is not present at their respective stations, then the machine cannot operate.

Referring now, to the wiring diagram, there is provided a pair of switch contacts 106 and 107, located on the door of a cabinet where all of the wiring for the machine is located. If the door is left ajar, then the switches will be open and the machine cannot operate. This is a safety measure, to be sure that the door is closed before the machine will operate.

An on-off switch, when turned on, will close the contacts 107 and 108, thereby readying the machine for operation. The contacts 95 of the electric eye 3CR may or may not be closed, depending upon whether there are springs located on the conveyor. If there are, then these contacts will be open, and the feeder will not vibrate. If no springs are present, and the beam of eye 3CR is not interrupted, then these contacts 95 of the relay will close to vibrate the feeder and add more springs to the conveyor.

Closing of the contacts 107 and 108 will also start the motor 109, which will drive the infeed and outfeed conveyors for the seal, as well as the conveyor for the springs.

An additional safety feature resides in the safety gate 110. This is a gate preferably of a transparent plastic material, which is adapted to hang in the front of the machine and is so arranged that the machine cannot operate unless this gate is in place. Furthermore, when the gate is in place, in its normal position, the machine can operate, but if it is moved away from its normal hanging position, the machine will shut off and all parts will promptly return to their normal unactuated positions. This is accomplished in a preferred form of the design, by having an arm 111 extending outwardly from the safety gate 110 at or near the upper end thereof. The gate is pivotally mounted to swing about its upper end.

Two limit switches are located on the frame of the machine and identified as LS12 and LS13. LS12 has a switch arm 112, extending therefrom, and LS13 has a similar switch arm 113, extending therefrom. The preferred specific arrangement of these parts may be understood by reference to FIG. 3A. It will be noted that in this arrangement, the switch arm 113 extends outwardly a greater distance than the switch arm 112. Also, the edge of the arm 111 is so shaped as to have a point 114 in contact with the roller on the switch arm 112. Adjacent this outwardly extending point 114, the edge of the arm 111 is contoured inwardly as at 114a so as to receive the roller on the switch arm 113. In this position of the parts therefor, the contacts of LS12 will be closed because of the actuation of the switch arm 112. On the other hand, the contacts of LS13 will be open because the arm 113 thereon is in its unactuated position in the recess 114a.

From this arrangement, therefore, it will be evident that if the safety gate 110 is caused to rotate about its upward pivotal point, either intentionally or inadvertently, it will immediately allow the contacts of switch arm 112 to open and, at the same time, those portions of the arm 11, adjacent the switch arm 113 will cam the switch arm inwardly to close the contacts of LS13. As will be seen presently, when discussing the wiring diagram, the opening of the contacts of LS12 will also open the contacts of a relay, thereby cutting off power to the circuit. At the same time, the closing of the contacts of LS13 will immediately cause the piston rod 39 to move upwardly, in the event it is down, and will retract the transfer rod 26 to carry the entire assembly back to its normal position, and the finger 84 will be returned to its normal position in the path of any oncoming seals, which is its normal position. The machine cannot thereafter be caused to cycle again until the safety gate 110 is back in its normal position with LS13 open and LS12 closed.

Figure 14:
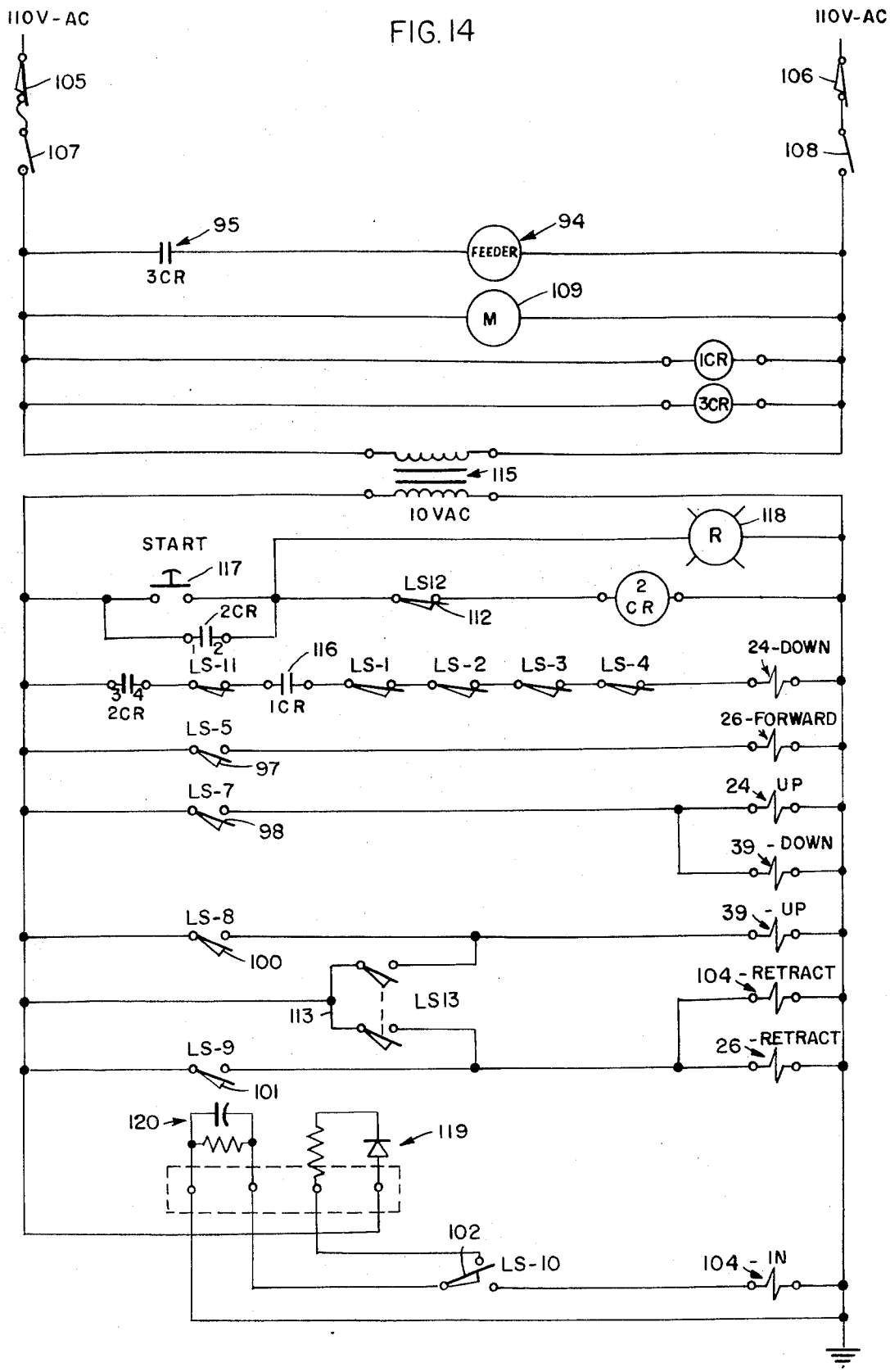
FIG. 14 is a schematic wiring diagram, illustrating the manner of achieving the sequence of the operations automatically.

Referring now to FIG. 14, there is shown the wiring diagram for a 110 volt circuit, with the door to the wiring cabinet closed so that the switch contacts 105 and 106 are closed. The on-off switch contacts 107 and 108 are then closed to set up the circuit. The power source for the control circuit is the transformer 115. The left side of the transformer is positive and the right side is grounded. At this time, if there is a spring at the first station, the beam of the electric eye will be interrupted and the contacts 116 of relay 1CR will be closed. If there is a seal on the conveyor, then the contacts of the LS11 will also be closed, as shown. Also, the contacts of the additional switches LS1 (FIG. 13); LS2 (FIGS. 2, 3 ans 6); LS3 (FIG. 2); and LS4 (FIG. 2) will likewise be closed. To start the cycle of the machine then, the start button 117 will be depressed to close the contacts thereof which thereupon sends current through the start light and through the safety guard switch LS12 to the relay 2CR, which closes holding contacts 1 and 2, as well as the contacts 3 and 4 thereof. This, then, completes the circuit to the solenoid valve for moving the piston rod 24 downwardly.

Downward movement of the piston rod 24 will trip LS5, by reason of arm 96, moving against switch arm 97 (FIG. 6). This, then, moves the transfer rod 26 in a forward direction, carrying with it the entire pick-up assembly, as heretofore described. When the guide rod 46 reaches its forward position, the collar 85 thereon will contact switch arm 98, thereby closing the contacts of LS7, which moves piston rod 24 up, and piston rod 39 down, thereby stripping the spring from the pick-up head, and seating it in the groove within the seal.

As the piston rod 39 reaches its lowermost position, the plate 99 thereon will trip LS8, thereby moving the piston rod 39 up. On the up stroke, the upper end of rod 90 will trip LS9, thereupon retracting piston rod 104 and gate finger 84, and retracting the transfer rod 26, and the pick-up assembly mounted thereon.

When the gate finger 84 is retracted to allow the sprung seal to move forwardly, the next seal to be sprung passes by the seal detector arm 103, which momentarily closes the contacts of LS10, sending a pulse, which shifts the rod 104 and the gate finger 84 back into its position in front of the next seal.

This latter function occurs by the use of what is commonly known as a Pulsa Pak, generally indicated in FIG. 14 by the numeral 119. This circuit is provided with a capacitor 120, which is normally charged to maintain the gate finger 84 in front of the seal. When LS10 is tripped by the moving seal contacting switch arm 103, a pulse is sent to retract the finger, and this discharges the capacitor. As the capacitor is again charged, the finger returns to its normal position in the front of the next seal.

All of the pistons are actuated, preferably, pneumatically. Each time one of the switches is tripped, a signal goes out to the appropriate solenoid valve, which thereupon delivers air, under pressure, to one or the other end of the appropriate cylinder, thereby to shift the piston rod therein, in the manner above explained.

The machine will continue to cycle in this manner, automatically, as long as springs and seals are in place, and as long as the safety gate switch LS12 is closed. If this gate is either removed or touched, in any way, to open the contacts of LS12, it will also close the contacts of LS13. As will be noted in FIG. 14, opening LS12 interrupts the power supply into the relay 2CR, thereupon opening the contacts 1 and 2 and the contacts 3 and 4. Closing the contacts of LS13 will by-pass LS8 and LS9, and will complete a circuit to immediately retract both the rod 26, and the pick-up assembly thereon, and the rod 104 with the finger 84 thereon, and will also move rod 39 up to its normal unactivated position.

From the foregoing, it will be evident that we have provided a fully automatic springing machine, capable of cycling continuously to pick up springs or other suitable annular expendable ring members, by stretching them over the bottom end of a pick-up head, and, thereafter, stripping them from the head onto a seal or other suitable object.

Changes may be made in the form, construction and arrangement of parts, from those disclosed herein, without in any way departing from the spirit of the invention or sacrificing any of the attendant advantages thereof, provided, however, that such changes fall within the scope of the claims appended hereto.

We claim:

1. A machine for applying an expandable ring member to a grooved object, or the like, comprising,
    a. a pick-up assembly including a mandrel initially positioned at a first station and having, at its lower end, an outer diameter greater than the inner diameter of said ring member when in its unexpanded condition,
    b. means for expanding a ring member located at said first station and applying it to said mandrel over the lower end thereof,
    c. means for transferring said pick-up assembly, with the ring member on said mandrel, to a second station, and
    d. means for stripping said ring member from said mandrel over the lower end thereof onto a grooved object positioned at said second station.

2. The combination of elements defined in claim 1, wherein said mandrel is cone-shaped, with the end of larger diameter positioned downwardly.

3. The combination of elements defined in claim 1 combined with a support for the ring member at said first station, said support having a forward edge, and wherein said means for expanding the ring member and applying it to said mandrel includes means for positioning the lower end of said mandrel at an angle with respect to said support with the forwardmost edge thereof against the inner circumference of the ring member at said edge of said support, and means for moving said mandrel forwardly and downwardly while in the angular position thereof, thereby wiping the lower end thereof against said edge of said support and picking up the ring member.

4. The combination of elements defined in claim 1, combined with ring detecting means at said first station to detect the presence of a ring member thereat, said ring detecting means being operable to prevent operation of said pick-up assembly and mandrel thereon in the absence of a ring member at said first station.

5. The combination of elements defined in claim 1, combined with conveyor means for conveying ring members in succession to said first station, and a vibratory feeder for feeding ring members to said conveyor.

6. The combination of elements defined in claim 5, combined with ring detecting means adjacent said feeder to detect the presence of a ring member on said conveyor, and means operable by said detecting means in the absence of a ring member on said conveyor to vibrate said feeder, thereby to cause additional ring members to be fed thereto.

7. A machine for applying an expandable ring member to a grooved object, or the like, comprising,
    a. a cone-shaped pick-up member positioned with the end of larger diameter at the bottom thereof and initially located at a first station, the diameter of said larger end being greater than the inner diameter of the ring member when in its unexpanded condition,
    b. means for supporting a ring member at said first station below said pick-up member,
    c. means for expanding the ring member and applying it to said pick-up member over the larger end thereof, d. transfer means for transferring said pick-up member with the ring member thereon to a second station, e. means for supporting the object to which the ring member is to be applied at said second station below said pick-up member, and f. means for stripping the ring member from said pick-up member onto the said object therebelow.

8. A machine for applying an expandable ring member to a grooved object, or the like, comprising, a. a cone-shaped pick-up member positioned with the end of larger diameter at the bottom thereof and initially located at a first station, the diameter of said larger end being greater than the inner diameter of the ring member when in its unexpanded condition, b. support means, having a forward edge thereon, for supporting a ring member at said first station below said pick-up member, c. means for positioning said pick-up member at said first station so that the bottom thereof is inclined at a predetermined angle with respect to a horizontal plane, and with the forwardmost edge thereof adjacent the inner circumference of said ring member, d. means for moving said pick-up member forwardly and downwardly at an angle substantially the same as the angle of inclination thereof whereby to wipe said bottom along the forward edge of said support means and expand the ring member thereover, e. means for transferring said pick-up member with the ring member thereon to a second station, and f. means for stripping the ring member from said pick-up member onto the said object at said second station.

9. The combination of elements defined in claim 7, combined with ring detecting means at said first station, and means operable by said detecting means in the absence of a ring member at said first station to prevent operation of said pick-up member.

10. The combination of elements defined in claim 7 combined with means for moving said pick-up member from an upper position to a lower position at said first station, and means responsive to the downward movement of said pick-up member to actuate said transfer means.

11. The combination of elements defined in claim 8, combined with means to rotate said pick-up member to a substantially upright position wherein the bottom thereof is substantially horizontal at said second station.

12. The combination of elements defined in claim 8, combined with means operable during the transfer of said pick-up member to said second station to rotate same to a substantially upright position wherein the bottom thereof is substantially horizontal at said second station.

13. A machine for applying an expandable ring member to a grooved object or the like, comprising, a. a cone-shaped pick-up member having the base of the cone lowermost and normally positioned at an angle with respect to horizontal diameter of said ring member when in its unexpanded condition, the diameter of said base being greater than the member, b. a support for a ring member below said pick-up member, said support having 1. a forward edge, and
  2. a yieldable stop normally positioned against said edge, but movable away therefrom under pressure of a ring member moving thereagainst, c. means for moving said pick-up member in an angular direction against the inner circumference of said ring member and against said stop and along said foward edge, thereby to expand said ring member over the larger end of said pick-up member and place it thereon, d. means for rotating said pick-up member to an upright position after picking up said ring member, and e. means for stripping said ring member from said pick-up member and onto an object positioned therebelow.

14. The combination of elements defined in claim 13, combined with ring detecting means adjacent said support, and means, operable by said ring detecting means in the absence of a ring member on said support, to prevent operation of said means for moving said pick-up member.

15. The combination of elements defined in claim 14, wherein said ring detecting means is a photoelectric cell mounted adjacent said support.

16. A machine for applying an expandable ring member to a grooved object, or the like, comprising, a. a pick-up assembly, including a cone-shaped pick-up member normally positioned with the base of the cone at the lower end thereof, b. a support for a ring member below said pick-up member at a first station, c. means for moving said pick-up member to expand the ring member over the base thereof and for transferring said assembly to a second station, and d. means responsive to the arrival of said assembly at the second station to move said assembly downwardly to a grooved object therebelow, and for stripping the ring member therefrom and onto the grooved object.

17. The combination of elements defined in claim 16, combined with means for initially moving said assembly downwardly to said ring member support, and means responsive to the initial downward movement of said assembly to actuate said means for moving said pick-up member and transferring it to the second station.

18. The combination of elements defined in claim 16, combined with conveyor means for advancing spring members successively to said first station.

19. The combination of elements defined in claim 18, combined with vibratory feeder means associated with said conveyor means for feeding ring members to said conveyor means.

20. The combination of elements defined in claim 16, combined with conveyor means for advancing objects, to which the ring members are to be applied, successively to the second station.

21. The combination of elements defined in claim 20, combined with object detecting means at said second station, and means operable in response to the actuation of said detecting means to interpose a finger in the path of movement thereof during application of the ring member thereto.

* * * * *

PO-1050
(5/69)

UNITED STATES PATENT OFFICE
CERTIFICATE OF CORRECTION

Patent No. 3858297  Dated January 7, 1975

Inventor(s) Scholin, Eitzinger, Lisiecke and Butkus

It is certified that error appears in the above-identified patent and that said Letters Patent are hereby corrected as shown below:

On the cover page, after Assignee, delete

"said Eitzinger, by said Butkus"

and change it to read - - by mesne assignments one-half interest to Scholin Industries, Inc., an Illinois corporation, and one-half interest to Mid-West Automation, Inc., an Illinois corporation - -

Column 3, line 33 "angel" should be - - angle - -

Signed and sealed this 29th day of April 1975.

(SEAL)
Attest:

RUTH C. MASON
Attesting Officer

C. MARSHALL DANN
Commissioner of Patents
and Trademarks